United States Patent
Ooi

(10) Patent No.: US 7,603,514 B2
(45) Date of Patent: Oct. 13, 2009

(54) METHOD AND APPARATUS FOR CONCURRENT AND INDEPENDENT DATA TRANSFER ON HOST CONTROLLERS

(75) Inventor: Eng Hun Ooi, Penang (MY)

(73) Assignee: Intel Corporation, Santa Clara, CA (US)

( * ) Notice: Subject to any disclaimer, the term of this patent is extended or adjusted under 35 U.S.C. 154(b) by 337 days.

(21) Appl. No.: 11/096,619

(22) Filed: Mar. 31, 2005

(65) Prior Publication Data

US 2006/0224792 A1      Oct. 5, 2006

(51) Int. Cl.
*G06F 13/00* (2006.01)
*G06F 13/14* (2006.01)

(52) U.S. Cl. .............................. 711/111; 710/5; 710/65; 710/74; 711/112

(58) Field of Classification Search ................... 711/111
See application file for complete search history.

(56) References Cited

U.S. PATENT DOCUMENTS

| | | |
|---|---|---|
| 5,561,826 A | 10/1996 | Davies et al. |
| 5,604,870 A | 2/1997 | Moss et al. |
| 5,758,127 A | 5/1998 | MacAulay et al. |
| 6,684,275 B1 | 1/2004 | Goldstein |
| 6,772,258 B2 | 8/2004 | Poisner et al. |
| 6,854,045 B2 | 2/2005 | Ooi et al. |
| 6,961,787 B2 | 11/2005 | Ooi |
| 6,983,338 B2 * | 1/2006 | Hadba et al. ................... 710/74 |
| 2003/0005231 A1 * | 1/2003 | Ooi et al. ..................... 711/131 |
| 2003/0191874 A1 * | 10/2003 | Drescher et al. .............. 710/38 |
| 2004/0243386 A1 * | 12/2004 | Stolowitz et al. .............. 703/25 |
| 2005/0027894 A1 * | 2/2005 | Ayyavu et al. ................. 710/5 |
| 2005/0268007 A1 * | 12/2005 | Nakabayashi ................ 710/62 |
| 2006/0075164 A1 | 4/2006 | Ooi |

OTHER PUBLICATIONS

Int'l. PCT Search Report and Written Opinion, for PCT/US2006/012994, Int'l. filing date Mar. 31, 2006, mailing date: Aug. 30, 2006, 12 pages.
Serial ATA: "High Speed Serialized AT Attachment", Rev. 1.0a, Jan. 7, 2003, XP-002394546, pages: title page + 1-34.
Serial ATA Enabling the Future, 2000. Serial ATA Working Group, WWW.SERIALATA.ORG/FAQS.HTML.
Serial ATA, Nov. 7, 2000, Maxtor Corporation, HTTP://WW.MAXTOR.COM/QUANTUM/SRC/WHITEPAPERS/WP_SERIALATA/HTM.

* cited by examiner

*Primary Examiner*—Kevin L Ellis
*Assistant Examiner*—Matthew Bradley
(74) *Attorney, Agent, or Firm*—Blakely, Sokoloff, Taylor & Zafman LLP

(57) ABSTRACT

An access detector detects an access type of an access to one of a plurality of serial ports interfacing to serial storage devices. The access is intended to one of a plurality of parallel channels interfacing to parallel storage devices via task file registers of the parallel channels. A mapping circuit maps the serial ports to the parallel channels. A state machine emulates a response from the one of the parallel channels based on the access type and the mapped serial ports.

22 Claims, 6 Drawing Sheets

METHOD AND APPARATUS FOR CONCURRENT AND INDEPENDENT DATA TRANSFER ON HOST CONTROLLERS

This invention relates to storage interface. In particular, the invention relates to interface to host controllers.

DESCRIPTION OF RELATED ART

Storage devices such as floppy drives, hard drives, and CD-ROM drives usually connect to a computer through an Integrated Drive Electronics (IDE) interface, also referred to as an Advanced Technology Attachment (ATA). Parallel ATA allows up to two devices to be connected to a single port using a master/slave communication technique. One ATA device is configured as a master and the other as a slave. This configuration allows one device's controller to tell the other device when it can transfer data to or from the computer. Both devices are daisy-chained together via one ribbon cable that is an unterminated multidrop bus. This bus or connection is typically referred to as a parallel channel. In addition, a personal computer (PC) may have two parallel ATA channels: a primary channel and a secondary channel.

The parallel ATA interface has existed in substantially the same form since 1989, and has become the highest volume disk drive device interface in production. However, as demand for higher transfer and storage bandwidths increases, the parallel ATA is nearing its performance limit. Serial ATA interface is introduced to replace parallel ATA. Serial ATA connects each of the two devices with individual cables in a point-to-point fashion. The benefits of serial ATA include high data transfer rates up to 150 MB/s (compared to 100 MB/s for parallel ATA), low cost, easy installation and configuration, low pin count, etc.

However, due the large amount of parallel ATA currently in existence, the transition from parallel ATA to serial ATA may be a problem. In order to avoid transition costs and provide an easy migration path, software drivers for parallel ATA have been modified to accommodate serial ATA and new serial ATA interface has been designed to be compatible with parallel ATA device. For instance, the hardware emulator is a hardware circuit that operates transparently to the parallel ATA driver so that the parallel ATA driver can control the serial ATA devices as if they were parallel ATA deices. There is a need for independent and concurrent data transfer when using serial ATA devices with a parallel ATA driver.

BRIEF DESCRIPTION OF THE DRAWINGS

The features and advantages of the present invention will become apparent from the following detailed description of the present invention in which.

DESCRIPTION

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

Figure 1:
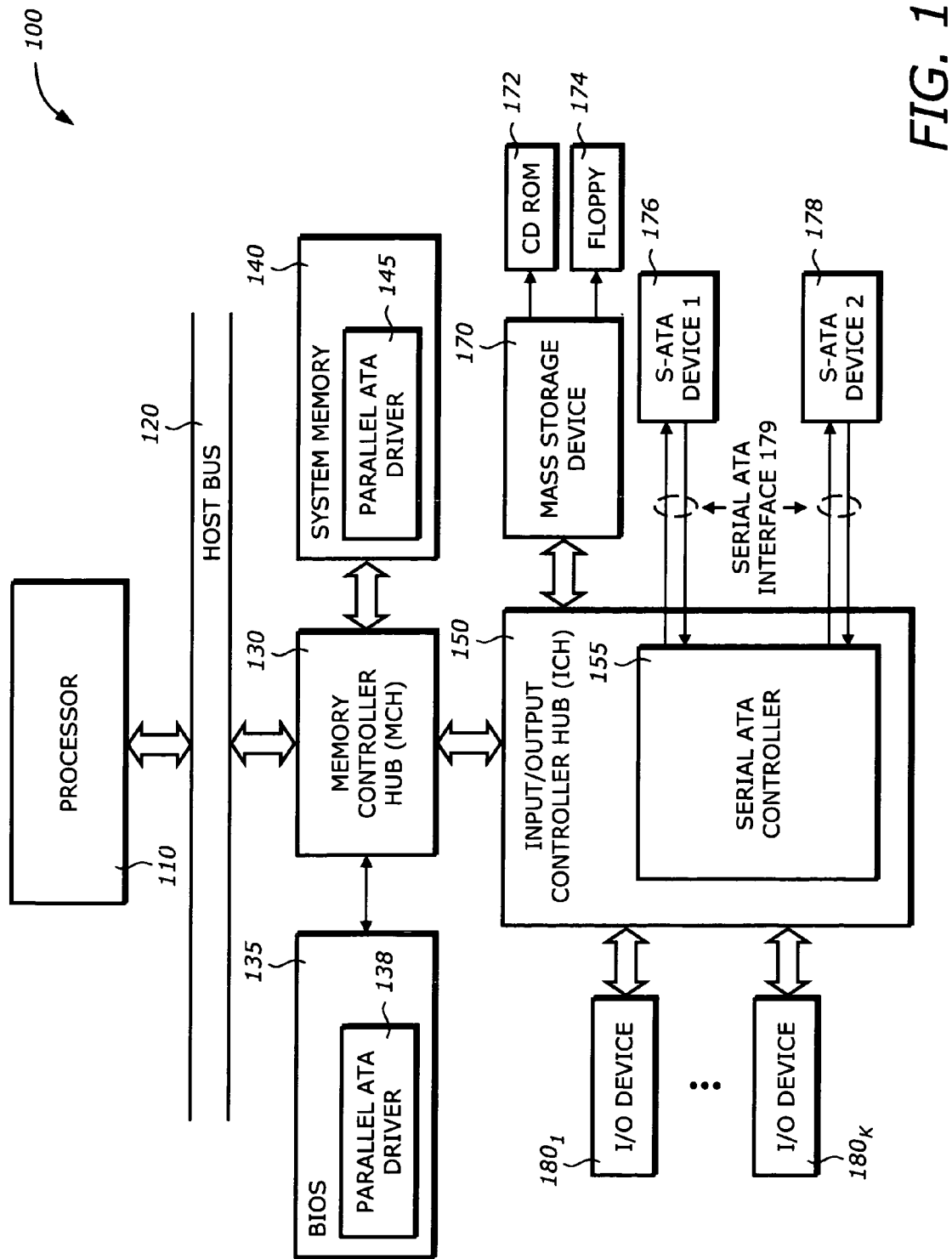
FIG. 1 is a diagram illustrating a system in which one embodiment of the invention can be practiced.

FIG. 1 is a diagram illustrating a computer system 100 in which one embodiment of the invention can be practiced. The computer system 100 includes a processor 110, a interconnect 120, a memory control hub (MCH) 130, a Basic Input/Output System memory 135, a system memory 140, an input/output control hub (ICH) 150, serial ATA devices 176 and 178, a mass storage device 170, and input/output devices 1801 to 180K.

The processor 110 represents a central processing unit of any type of architecture, such as embedded processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture. In one embodiment, the processor 110 is compatible with the Intel Architecture (IA) processor, such as the IA-32 and the IA-64. The processor 110 typical contains a number of control registers to support memory management tasks such as virtual memory and cache memory. These tasks may include paging and segmentation. The chip with the processor 110 may have only one processor core or more than one processor core. The interconnect 120 provides interface signals to allow the processor 110 to communicate with other processors or devices, e.g., the MCH 130. The interconnect 120 may support a uni-processor or multiprocessor configuration. The interconnect 120 may be parallel, sequential, pipelined, asynchronous, synchronous, or any combination thereof. The interconnect 120 may be point-to-point or can be connected to more than two chips.

The MCH 130 provides control and configuration of memory and input/output devices such as the system memory 140 and the ICH 150. The MCH 130 may be integrated into a chipset that integrates multiple functionalities such as the isolated execution mode, host-to-peripheral bus interface, memory control. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc. In one embodiment, the MCH 130 can be in the same chip as the processor 110. In some embodiments, the same MCH 130 may work for all core or processors in the chip with the processors. In other embodiments, the MCH 130 may include different portions that may work separately for different cores or processors in the chip with the processors.

The BIOS memory 135 stores boot-up code and data. The BIOS memory 135 typically is implemented with non-volatile memory such as Read Only Memory (ROM), flash memory, and other similar memories. The BIOS memory 135 may also be stored inside the MCH 130. The BIOS memory 135 may contain a parallel ATA driver 138 to control the serial ATA devices 176 and 178 via the ICH 150.

The system memory 140 stores system code and data. The system memory 140 is typically implemented with dynamic random access memory (DRAM) or static random access memory (SRAM). Other types of memories may be used including those that do not need to be refreshed. The system memory may include program code or code segments implementing one embodiment of the invention. The system memory may also include a parallel ATA driver 145. The parallel ATA driver 145 may be part of an Operating System (OS) or an application program. The parallel ATA driver 145 accesses the serial ATA devices 176 and 178 via the ICH 150. The parallel ATA driver 138 in the BIOS memory 135 and the parallel ATA driver 145 in the memory 140 may or may not co-exist.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface, processor interface, interrupt controller, direct memory access (DMA) controller, power management logic, timer, universal serial bus (USB) interface, mass storage interface, low pin count (LPC) interface, etc. In particular, the ICH 150 includes an ATA controller 155 to control serial ATA devices 176 and 178. The ATA controller 155 has hardware emulator for backward compatibility with the parallel ATA device drivers. The ATA controller 155 provides a migration path for customers to take advantage of the serial ATA interface while using the existing parallel ATA drivers.

The serial ATA devices 176 and 178 are mass storage devices or hard disk to store archive information such as code, programs, files, data, application, operating systems, etc. The serial ATA devices 176 and 178 are connected to the hard drive controller 155 via serial ATA interface signals 179. The serial ATA interface, protocols, and standards follow the proposed draft entitled "Serial ATA/High Speed Serialized AT Attachment" by the Serial ATA Workgroup, Revision 1.0.0.1, published Apr. 9, 2001. The mass storage device 170 stores other archive information. The mass storage device 170 may include compact disk (CD) ROM 172, floppy diskettes 174, and hard drive 176, and any other magnetic or optic storage devices. The mass storage device 170 provides a mechanism to read machine-readable media.

The I/O devices 1801 to 180K may include any I/O devices to perform I/O functions. Examples of I/O devices 1801 to 180K include controller for input devices (e.g., keyboard, mouse, trackball, pointing device), media card (e.g., audio, video, graphics), network card, and any other peripheral controllers.

On a parallel ATA interface, after power-on, a hardware or software reset, or after execution of an Executive Device Diagnostic command, the slave device presents the diagnostic status to the master device via a PDIAG—wire in the ATA ribbon cable. Upon observing the status on the PDIAG— signal, the master device updates the status and error registers accordingly. For serial ATA interface, such direct communication between the two serial ATA devices does not exist. In addition, on a parallel ATA interface, both ATA devices on the same channel observe the signal activity on the cable. For example, the write access to the ATA Command Block registers (except the Data and Command registers) is seen and accepted by both devices. On the other hand, in serial ATA interface, each serial ATA device is independent of the other.

In order to mimic the interaction visible to the parallel ATA driver 138, the emulator in the ATA controller 155 forwards and manipulates software accesses to both serial ATA devices 176 and 178 which are mapped as parallel ATA devices on virtual ATA channel. In addition, the emulator also routes the serial ATA devices' interrupt to either IRQ14 or IRQ15.

Figure 2:
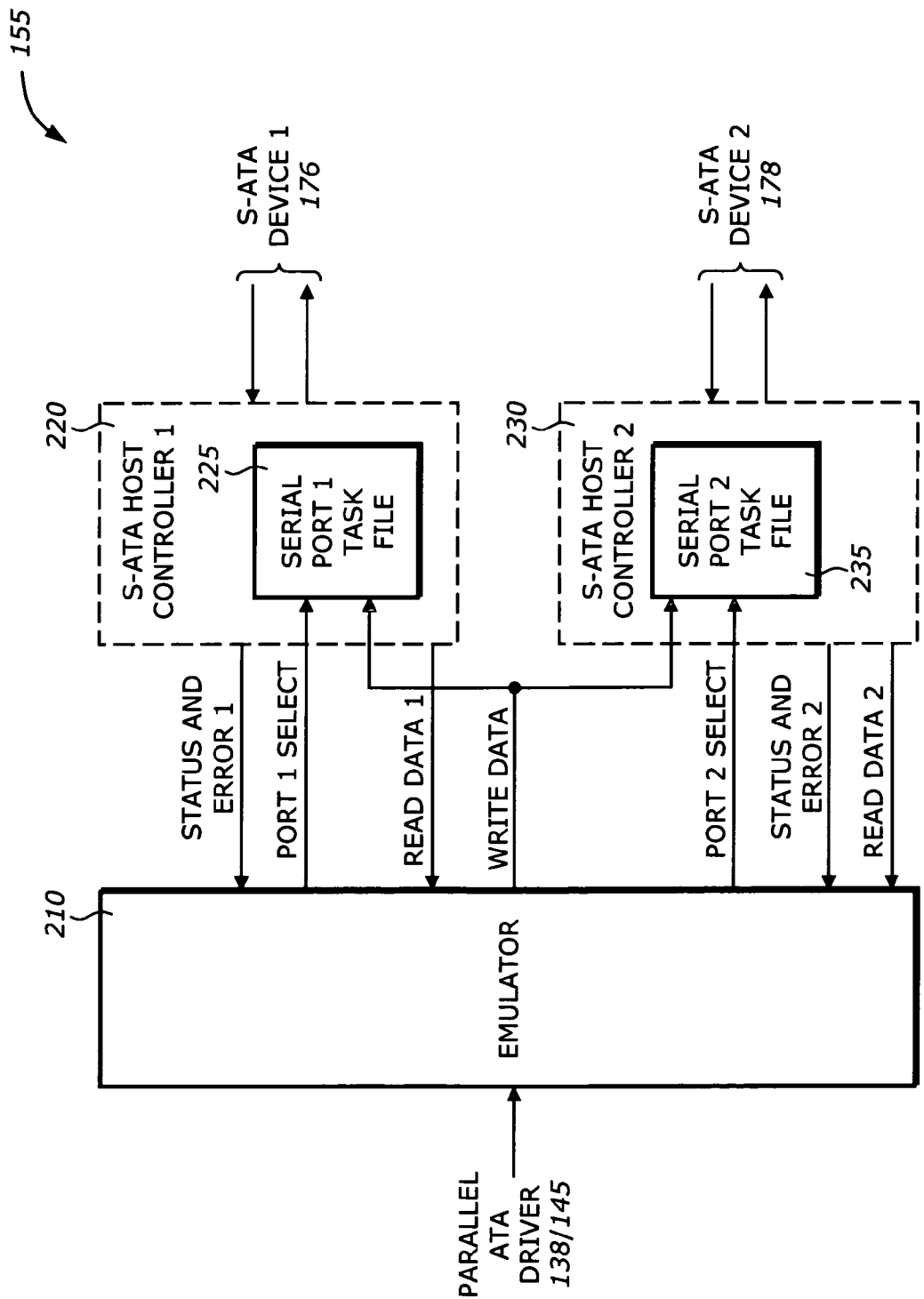
FIG. 2 is a diagram illustrating an ATA controller shown in FIG. 1 utilizing a hardware emulator.

FIG. 2 is a diagram illustrating the ATA controller 155 utilizing a hardware emulator 210. The ATA controller 155 includes an emulator 210 and serial ATA host controllers (1 and 2) 220 and 230. The emulator 210 emulates a response of a parallel ATA device when interacting with the parallel ATA driver 138. The emulator 210 is a hardware circuit that operates transparently to the parallel ATA driver 138 so that the parallel ATA driver 138 can still control the serial ATA devices 176 and 178 as if they were parallel ATA devices. The emulator 210 may be disabled when the ATA driver is written directly for the serial ATA devices 176 and 178.

The serial ATA host controllers 220 and 230, which are also referred to as the serial ports, contain registers, control circuits, and interface circuits to the serial ATA devices 176 and 178, respectively. In particular, the serial ATA host controllers 220 and 230 contain the serial port task files (1 and 2) 225 and 235, respectively, which contain the operational registers that control and configure the corresponding serial ATA devices 176 and 178. One such register defined in the ATA specification is the device/head register, which contains the device and head numbers.

The emulator 210 selects a serial port as mapped to the parallel channel via the port 1 select or port 2 select signals. The emulator 210 writes data to the selected serial port via the write data signal path and reads data from the selected serial port via the corresponding read data signal paths. The serial ATA host controllers 220 and 230 provide the status and error conditions to the emulator 210.

Figure 3:
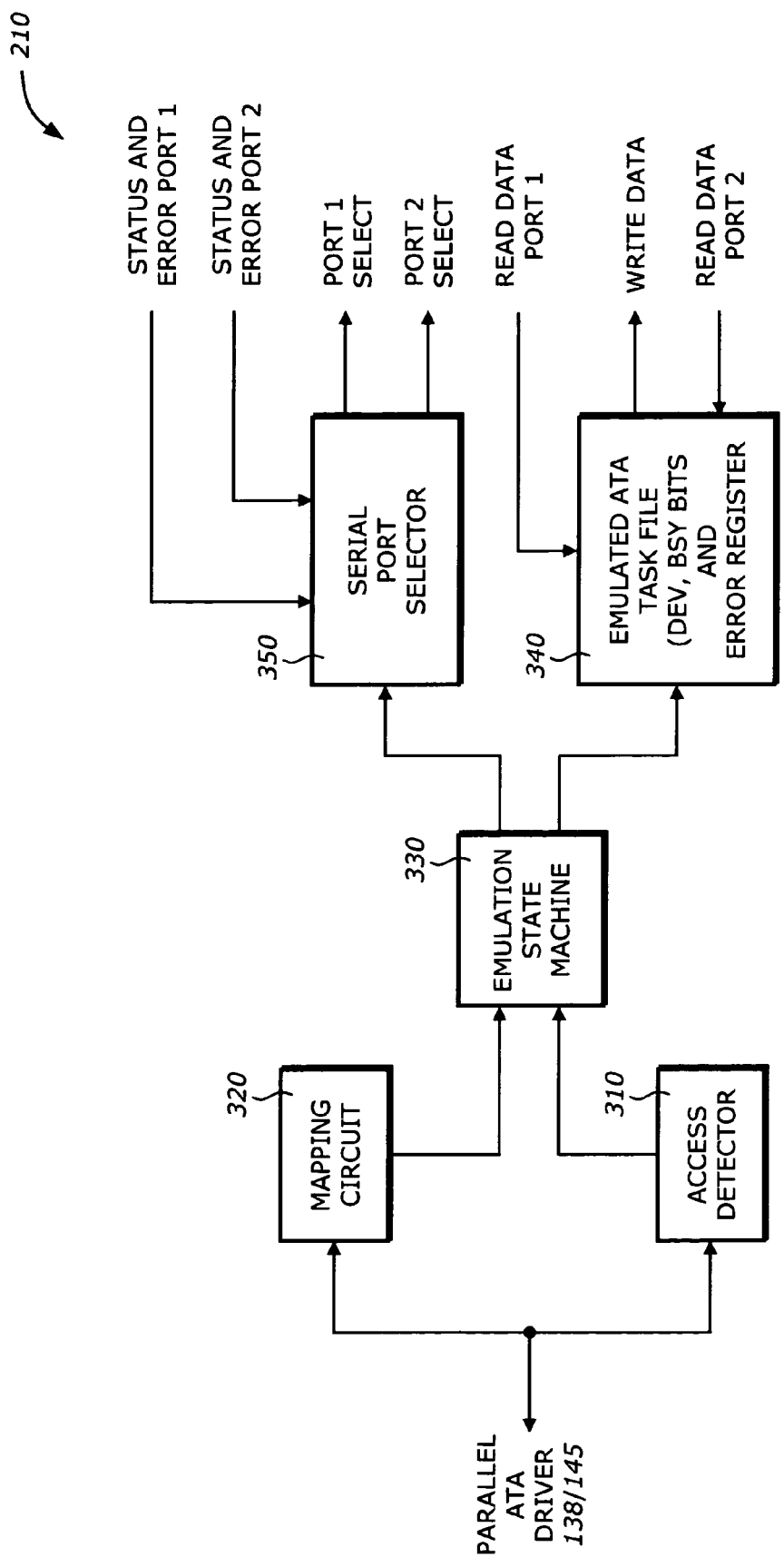
FIG. 3 is a diagram illustrating an emulator in the ATA controller shown in FIG. 2.

FIG. 3 is a diagram illustrating the emulator 210 in the ATA controller shown in FIG. 2. The emulator 210 includes an access detector 310, a mapping circuit 320, an emulation state machine 330, an emulated task file register set 340, and a serial port selector 350. The access detector 310 detects an access type of an access to one of the serial ports 220 and 230 interfacing to the serial storage devices 176 and 178. The access is provided by the parallel ATA driver 138 and is intended to one of the parallel channels interfacing to parallel storage devices via the task file registers of the parallel channels.

The mapping circuit 320 maps the serial ports to the parallel channels. The mapping may be done by an address translation. A serial port may also be mapped to a master or slave parallel channel according to a device (DEV) bit in the device/head register.

The emulation state machine 330 emulates a response from one of the parallel channels based on the access type as detected by the access detector 310 and the mapped serial ports as provided by the mapping circuit 320. The state machine 330 includes a number of states to perform a sequence of operations according to the access type. For instance, there are several states corresponding to emulation of the response according to different access types and an interrupt state corresponding to emulation of interrupt generation.

The emulated task file register set 340 emulates the task file registers of the parallel channels. These registers may include information about the device (DEV), busy (BSY) bits and the error register.

The serial port selector 350 selects one of the serial ports 220 and 230 based on the mapped serial ports provided by the mapping circuit 320. For example, when the parallel ATA driver 138 generates an access to a parallel channel, the mapping circuit 320 may translate the address of the parallel channel into a serial port. Alternatively, the mapping circuit 320 may map according to a device (DEV) bit in the device/head register. This mapping information is passed to the serial port selector 350 directly or via the state machine 330 to select the corresponding serial port. The selection may be performed by enabling the selected serial ATA host controller 220 or 230.

Figure 4:
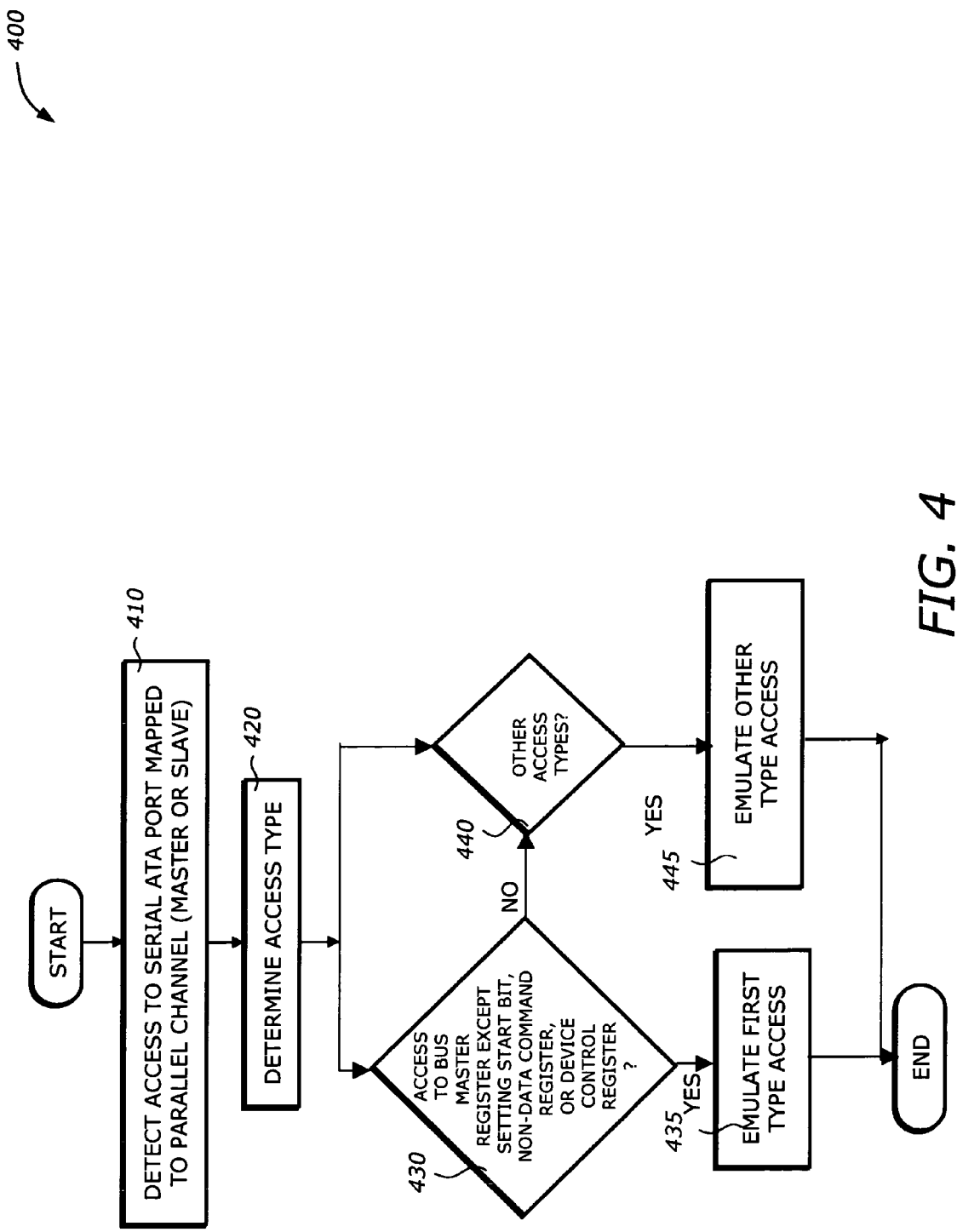
FIG. 4 is a flowchart illustrating a process to emulate a response from a parallel channel based on access type according to one embodiment of the invention.

FIG. 4 is a flowchart illustrating a process 400 to emulate a response from a parallel channel based on access type. Upon START, the process 400 detects an access to the serial ATA port which is mapped to a parallel channel, either as a master or slave channel (Block 410). The access is made by the parallel ATA driver 138. Then, the process 400 determines the type of access (Block 420). This can be done by decoding the access information such as addresses and read/write information. The type of access may be one of several access types.

The process 400 determines if the access is a first access type, such that it is a first read to one of a bus master register (BM-IDE), a non-data command register, and a device control register (Block 430). The access may also be a first write to one of a bus master register (BM-IDE) except setting a START bit of bus master command register to a logical one '1', a non-data command register, and a device control register (Block 430). If so, the process 400 emulates a first type access (Block 435) and is then terminated. Otherwise, the process 400 determines that the access is another access type (Block 440) and emulates the other access type (Block 445). The other access type may be access to a device/head register, or a read access to a status register, an alternate register, or an error register of a selected serial port mapped to a slave parallel channel after a power-on, hardware or software reset, or an execution of the device diagnostics command. The other access type may also be a read access to a status register or an alternate register of a serial port mapped to a master parallel channel after a power-on, hardware or software reset, or an execution of the device diagnostics command. The other access type may also be a read access to an error register of a serial port mapped to a master parallel channel after a power-on, hardware or software reset, or an execution of the device diagnostics command.

To set up a command on an SATA Device 176 or 178, the respective Host Controller 220 or 230 typically performs a sequence of events. It reads a status register to determine that the channel is not busy. It writes the device/head register to ensure that the correct device is selected. It writes a sector count register to indicate the number of sectors to be transferred. It writes a sector number register to load part of a logical block addressing (LBA) address. It writes a cylinder low register to load part of the LBA address. It writes a cylinder high register to load part of the LBA address. It writes the command register with the command to be executed in four phases: dispatch, start I/O, IRQ, and completion.

The commands from the host are received by the selected Serial ATA device following selection. The host controller discriminates between the two devices by using the DEV bit in the device/head register. The DEV bit is programmed to indicate which device it wants to transfer data to or from. A '0' selects device 0, which may be designated as master device. Otherwise, the DEV bit selects device 1, which may be designated as the slave device. In traditional controller operation, however, the register contents go to both devices and their controllers. Accordingly, in traditional controller operation, the register writes are forwarded to both master and slave task file register 225 and 236 and BM-IDE registers.

Figure 5:
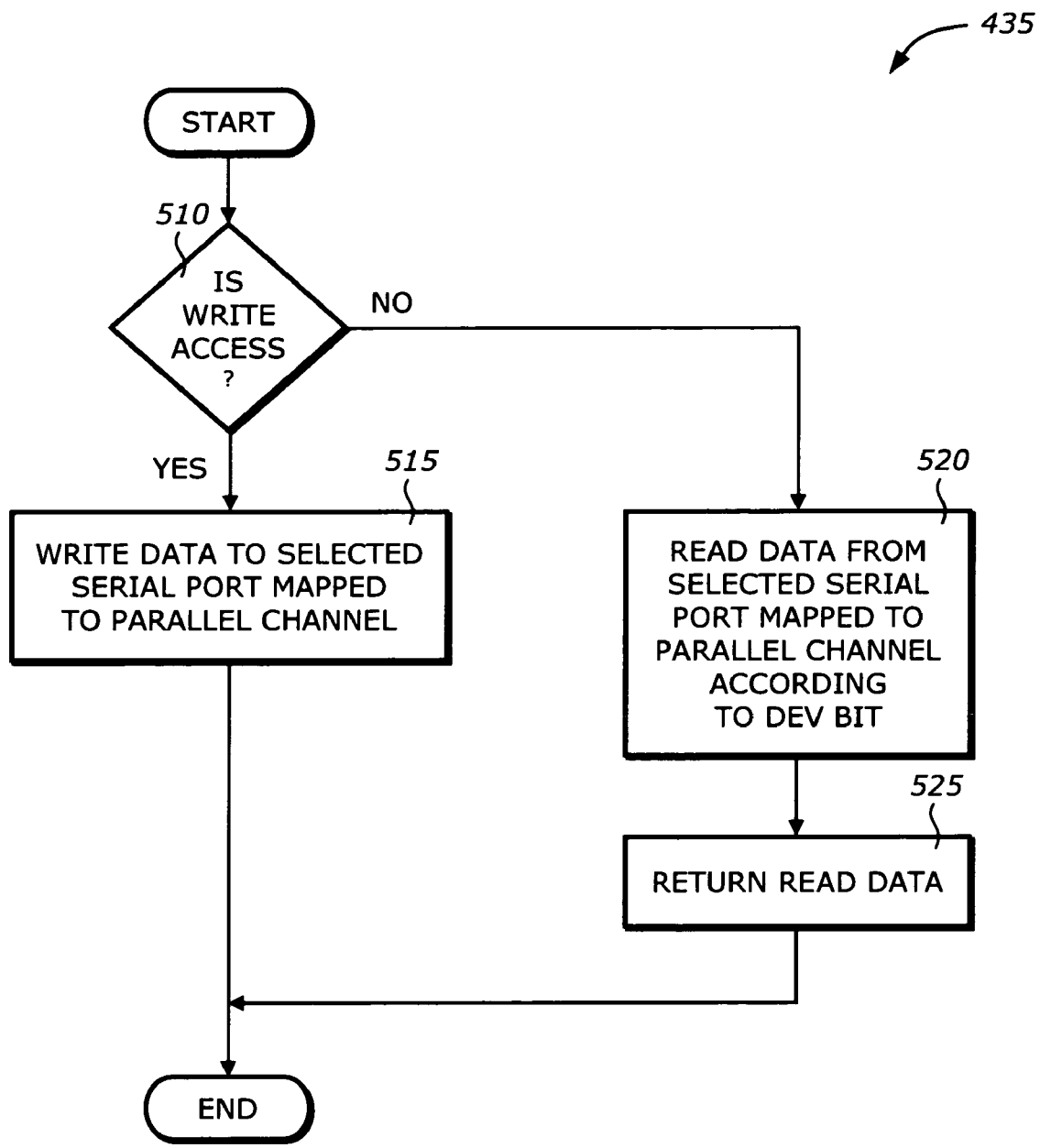
FIG. 5 is a flowchart illustrating a process to emulate a response when the access type is a first access type according to one embodiment of the invention.

FIG. 5 is a flowchart illustrating the process 435 to emulate a response when the access type is the first access type according to one embodiment of the invention. The process 435 is performed by the first state in the state machine 330 shown in FIG. 3. Upon START, the process 435 determines if the access is a write access (Block 510). In one embodiment of the current invention, the DEV bit is written before any associated writes to the BM-IDE register or the task files 225 or 235. When the DEV bit is equal to zero, Device 0 is selected. When the DEV bit is equal to one, Device 1 is selected.

Accordingly, the emulation hardware has a mode in which it does not forward the write cycles to both master and slave BM-IDE registers and shadow task files. Instead, the write cycles are forwarded to the specific device according to the DEV bit. This is different from traditional operation, in which the emulator forwards the write cycle to both the master and slave device task file registers and BM-IDE I/O registers.

If the access is a write access, the process 435 writes the data to the selected serial port that is mapped to the parallel channel according to the device (DEV) bit (Block 515) and is then terminated. Based on the write cycle, the host register set of the chosen device is set, rather than setting both host register sets. Accordingly, the master and slave ATA devices are accessed as being completely independent of each other. Thus, concurrent and independent data transfer can be performed on two Serial ATA drives which appear to parallel ATA drive as master and slave drives. Otherwise, if the access is a read access, the process 435 reads the data from the selected serial port that is mapped to the parallel channel according to the DEV bit (Block 520). Then, the process 435 returns the read data to the access requester and is then terminated.

Figure 6:
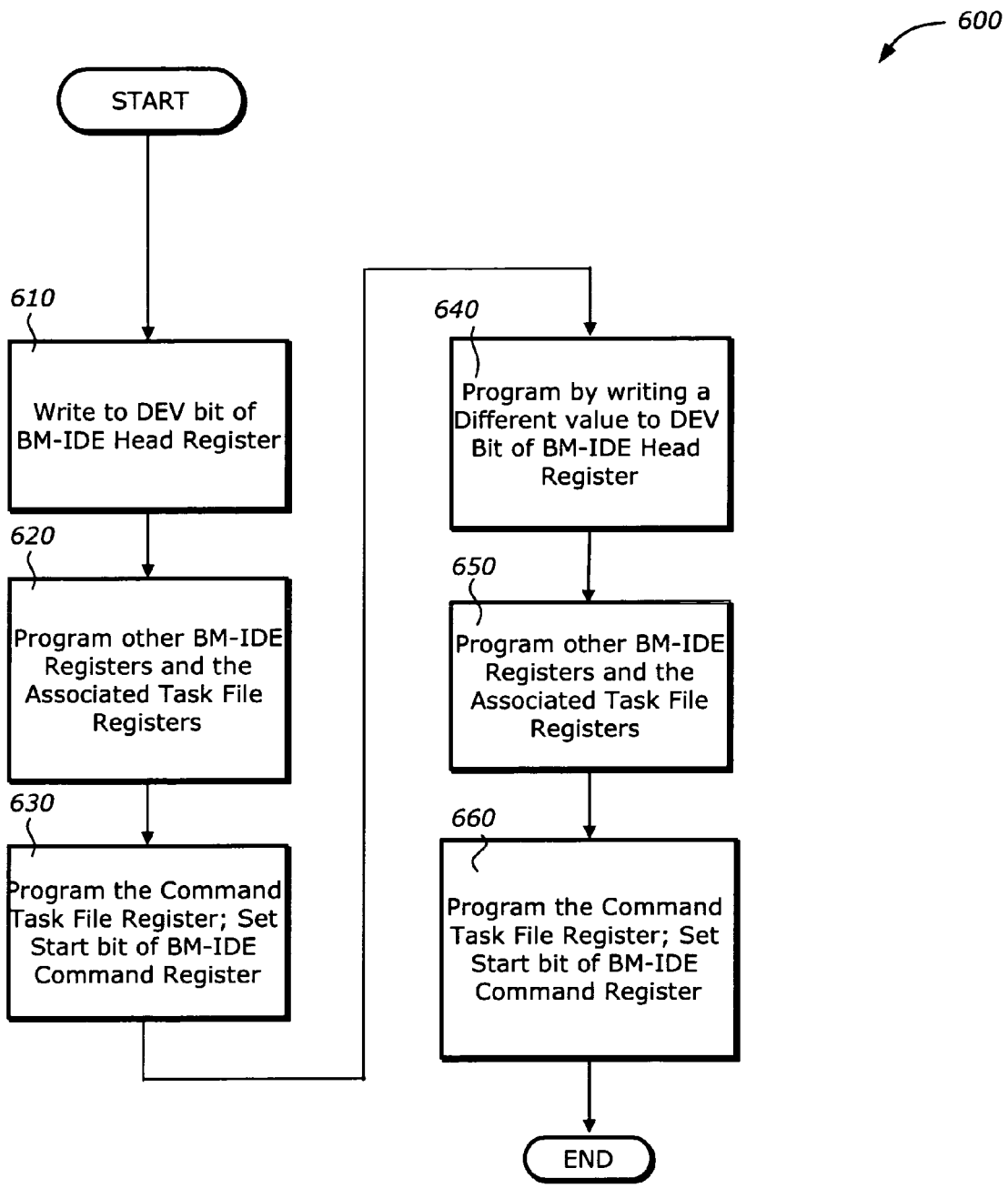
FIG. 6 is a flowchart illustration of an embodiment of a software programming sequence with respect to DEV bit setting.

FIG. 6 is an illustration of an embodiment of a software programming sequence to accomplish DEV bit setting. In block 610, the process 600 writes to the DEV bit of device/head register of the serial port corresponding to the selected device. In block 620, the process 600 programs other BM-IDE registers and associated task file registers. In one embodiment, the process 600 writes to the BM-IDE and task file registers associated with the selected serial port. In block 630, the process 600 programs the command task file register and sets the Start bit of BM-IDE command register. In block 640, the process 600 writes a different value to DEV bit of the device/head register. In block 650, the process 600 programs other BM-IDE registers and associated task-file registers as necessary. In block 660, the process 600 programs the command task file register and set the Start bit of BM-IDE command register before terminating.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention. For example, although the above description refers to serial and parallel ATA interfaces, the technique can be applied to any point-to-point interface.

The present invention may be implemented by hardware, software, firmware, microcode, or any combination thereof. When implemented in software, firmware, or microcode, the elements of the present invention are the program code or code segments to perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. The program or code segments may be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk (CD-ROM), an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

It is noted that the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

What is claimed is:

1. An apparatus comprising:
a first host controller interfacing to a first hard drive, wherein for a first data transfer operation, upon a positive determination that a channel selected for the first data transfer operation is not busy, a device bit in a device/head registers on the first host controller is written to before bus master registers and associated task file registers on the first host controller are written; and
wherein based on the data written in the device/head register on the first host controller, transfer data is written to another register on the first host controller.

2. The apparatus of claim 1, further comprising:
a second host controller interfacing to a second hard drive, wherein for a second data transfer operation, a device bit in a device/head register on the second host controller is written to before other registers on the second host controller; and
wherein based on the data written in the device/head register on the second host controller, transfer data is written to another register on the second host controller.

3. The apparatus of claim 2, wherein the first and second hard drives are serial Advanced Technology Attachment devices.

4. The apparatus of claim 2, wherein the first and second data transfer operations include concurrently and independently transferring data between the first host controller and the first hard drive, and the second host controller and the second hard drive.

5. The apparatus of claim 2, wherein one of the first and second hard drives is mapped as a master drive.

6. An apparatus comprising:
a plurality of parallel channels;
a plurality of serial ports interfacing to serial storage devices, wherein the parallel channels are mapped to serial ports;
a device/head register on a first serial port, wherein for a first data transfer operation, upon a positive determination that a parallel channel of the plurality of parallel channels selected for the first data transfer operation is not busy, the device/head register is written to before bus master registers and associated task file registers on the first serial port are written; and
wherein based on the data written in the device/head register of the first serial port, another register on the first serial port is accessed.

7. The apparatus of claim 6, wherein accessing another register on the first serial port comprises writing data to another register on the first serial port.

8. The apparatus of claim 6, wherein accessing another register on the first serial port comprises reading data from another register on the first serial port.

9. The apparatus of claim 6, further comprising:
a device/head register on a second serial port, wherein for a first data transfer operation, the device/head register is written to before other registers on the second serial port; and
wherein based on the data written in the device/head register of the second serial port, another register on the second serial port is accessed.

10. The apparatus of claim 9, wherein accessing another register on the second serial port comprises writing data to another register on the second serial port.

11. The apparatus of claim 9, wherein accessing another register on the second serial port comprises reading data from another register on the second serial port.

12. The apparatus of claim 9, wherein the first and second data transfer operations include concurrently and independently transferring data between the first serial port and the corresponding serial storage device, and the second serial port and the corresponding serial storage device, the serial storage device corresponding to the first serial port being a master, the serial storage device corresponding to the second serial port being a slave.

13. The apparatus of claim 6, wherein writing to a device/head register on a first serial port before writing to other registers on the first serial port comprises writing to a device bit in a device/head register of the first serial port.

14. The apparatus of claim 6, wherein writing to the device/head register on the first serial port before writing to other registers on the first serial port comprises writing to the device bit in the device/head register before writing to a bus master or task file register of the first serial port.

15. The apparatus of claim 6, wherein accessing another register on the first serial port comprises accessing at least one of the bus master or task file registers corresponding to the first serial port.

16. A system comprising:
a plurality of serial storage devices; and
a chipset coupled to the serial storage devices, the chipset having a serial storage controller, the serial storage controller comprising:
a mapping circuit to map a plurality of serial ports interfacing to the serial storage devices to a plurality of parallel channels;
a state machine coupled to the mapping circuit to emulate a response from a parallel channel of the plurality of parallel channels based on access type;
a serial port selector coupled to the state machine and the serial ports to select one of the serial ports; and
a plurality of registers coupled to the state machine to emulate task file registers of the parallel channel mapped to the selected serial port, wherein upon a positive determination that the parallel channel of the plurality of parallel channels is not busy, a device bit in a device/head register of the selected serial port is written to before any one of a corresponding bus master or task file registers.

17. The system of claim 16 wherein the state machine comprises:
   a first write state to write data to the selected serial port mapped to the one of the parallel channels according to the device bit; and
   a first read state to read data from the selected serial port mapped to the one of the parallel channels according to the device bit.

18. The system of claim 16, further comprising:
   an access detector to detect a first access type of an access to one of a plurality of serial ports interfacing to the serial storage devices, the access being intended to one of a plurality of parallel channels.

19. The system of claim 18, wherein the first access type includes a first write to one of a bus master register except setting a START bit of bus master command register to a logical one, a non-data command register, and a device control register, the state machine emulating the response from the parallel channel based on the first access type comprises writing data to at least a bus master or task file register corresponding to the selected serial port based on the device bit, without writing the data to a register corresponding to another serial port.

20. A method comprising:
   determining that a parallel channel mapped to a first serial port is not busy;
   writing to a device bit of a device/head register associated with the first serial port if the parallel channel is not busy;
   writing to registers associated with the first serial port other than the device/head register after the device bit is written;
   writing to command task file registers associated with the first serial port; and
   setting a start bit of a command register associated with the first serial port.

21. The method of claim 20, further comprising:
   emulating a response from the parallel channel for a first access type, the first access type including access to any one of a bus master register except setting a START bit of bus master command register to a logical one, a non-data command register, or a device control register.

22. The method of claim 21, further comprising:
   for the first access type, writing data to a bus master or task file register corresponding to the selected serial port based on the device bit, without writing the data to a register corresponding to another serial port.

* * * * *